(12) United States Patent
Higure

(10) Patent No.: US 7,499,723 B2
(45) Date of Patent: Mar. 3, 2009

(54) SYSTEM AND METHOD FOR SYNCHRONIZATION BETWEEN BASE STATIONS

(75) Inventor: Kinichi Higure, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 546 days.

(21) Appl. No.: 11/341,365

(22) Filed: Jan. 30, 2006

(65) Prior Publication Data

US 2006/0193306 A1 Aug. 31, 2006

(30) Foreign Application Priority Data

Jan. 31, 2005 (JP) ............................. 2005-023017

(51) Int. Cl.
*H04B 7/00* (2006.01)
(52) U.S. Cl. ...................... 455/523; 370/350; 370/503; 375/356; 455/502
(58) Field of Classification Search ................. 455/523, 455/502; 370/503; 375/356
See application file for complete search history.

(56) References Cited

U.S. PATENT DOCUMENTS

| 4,041,495 | A | * | 8/1977 | Martin ...................... 342/465 |
| 5,361,277 | A | * | 11/1994 | Grover ...................... 375/356 |
| 5,570,355 | A | * | 10/1996 | Dail et al. ................... 370/352 |
| 5,590,173 | A | * | 12/1996 | Beasley ...................... 370/307 |
| 5,602,834 | A | * | 2/1997 | Dean et al. .................. 370/335 |
| 5,678,177 | A | * | 10/1997 | Beasley ........................ 455/16 |
| 5,953,344 | A | * | 9/1999 | Dail et al. ................... 370/443 |
| 5,963,557 | A | * | 10/1999 | Eng ............................ 370/432 |
| 5,990,687 | A | * | 11/1999 | Williams ..................... 324/529 |
| 6,023,628 | A | * | 2/2000 | Beasley ...................... 455/561 |
| 6,075,972 | A | * | 6/2000 | Laubach et al. ............. 455/3.05 |
| 6,121,933 | A | * | 9/2000 | Cosenza et al. ......... 343/700 MS |
| 6,269,302 | B1 | * | 7/2001 | Yoshida ....................... 701/207 |
| 6,356,555 | B1 | * | 3/2002 | Rakib et al. ................. 370/441 |
| 6,370,153 | B1 | * | 4/2002 | Eng ............................ 370/438 |
| 6,744,823 | B1 | * | 6/2004 | Kamemura et al. ......... 375/267 |
| 6,937,151 | B1 | * | 8/2005 | Tapanes ...................... 340/550 |
| 6,975,655 | B2 | * | 12/2005 | Fischer et al. ............... 370/516 |
| 7,098,756 | B2 | * | 8/2006 | Martikkala et al. .......... 333/111 |
| 7,155,244 | B2 | * | 12/2006 | Edge .......................... 455/502 |

(Continued)

FOREIGN PATENT DOCUMENTS

JP 11-068649 3/1999

(Continued)

*Primary Examiner*—Duc Nguyen
*Assistant Examiner*—Hai V Nguyen
(74) *Attorney, Agent, or Firm*—Mattingly, Stanger, Malur & Brundidge, P.C.

(57) ABSTRACT

An inter-base station synchronization system is constructed without using any receiver for detecting a frame period error at a zone boundary between leaky coaxial cables, and without using any exclusive line or dedicated radio waves for use in transmitting the frame period error information from this receiver to base stations. This system has a plurality of base stations provided in certain intervals, leaky coaxial cables laid down between the base stations, and one, or a plurality of, mobile station that measure a time delay difference of received signals from adjacent ones of the base stations while the mobile stations move along zone boundaries between leaky coaxial cables, and that transmit the delay time difference information through the leaky coaxial cables to at least either one of the two adjacent base stations.

10 Claims, 13 Drawing Sheets

U.S. PATENT DOCUMENTS

| | | | | |
|---|---|---|---|---|
| 7,286,610 | B2 * | 10/2007 | Kamemura et al. | 375/267 |
| 7,286,611 | B2 * | 10/2007 | Kamemura et al. | 375/267 |
| 7,321,610 | B2 * | 1/2008 | Lu | 375/148 |
| 2001/0053194 | A1 * | 12/2001 | Johnson | 375/356 |
| 2004/0180650 | A1 * | 9/2004 | Kamemura et al. | 455/422.1 |
| 2004/0180698 | A1 * | 9/2004 | Kamemura et al. | 455/562.1 |
| 2004/0246070 | A1 * | 12/2004 | Martikkala et al. | 333/125 |
| 2005/0176368 | A1 * | 8/2005 | Young et al. | 455/11.1 |

FOREIGN PATENT DOCUMENTS

| | | |
|---|---|---|
| JP | 2000-307503 | 11/2000 |
| JP | 2001-268628 | 9/2001 |
| JP | 2004-072482 | 3/2004 |

* cited by examiner

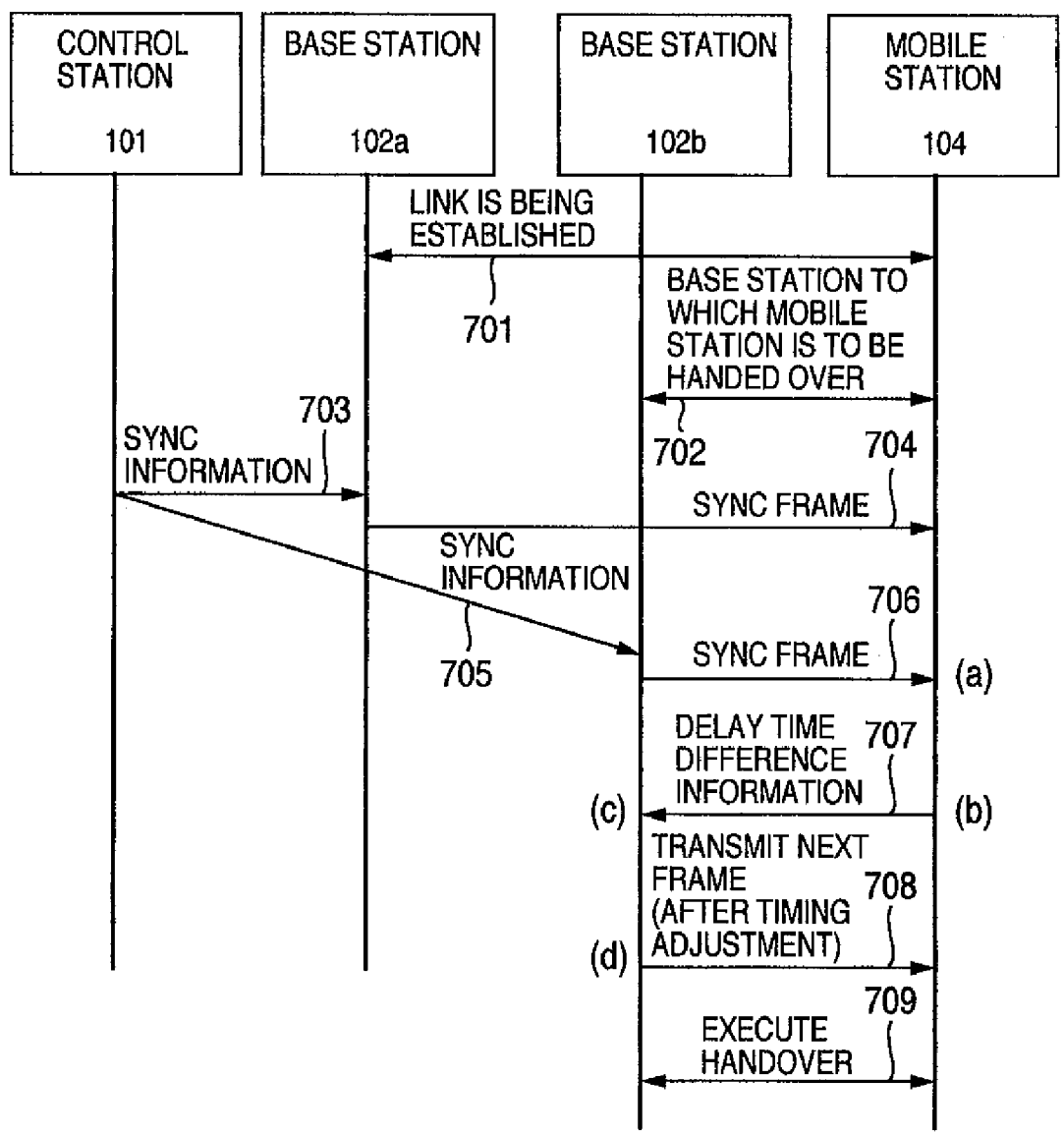

FIG.10

| BASE STATION | CODE | DELAY TIME (SET) | FREE-RUNNING TIMING |
|---|---|---|---|
| 102a | aaaa | d1 | vd1 |
| 102b | bbbb | d2 | vd2 |
| ⋮ | ⋮ | ⋮ | ⋮ |
| 102n | nnnn | dn | vdn |
| 1001 | 1002 | 1003 | 1004 |

SYSTEM AND METHOD FOR SYNCHRONIZATION BETWEEN BASE STATIONS

INCORPORATION BY REFERENCE

The present application claims priority from Japanese application JP2005-023017 filed on Jan. 31, 2005, the content of which is hereby incorporated by reference into this application.

BACKGROUND OF THE INVENTION

The present invention relates to systems and methods for synchronization between base stations that communicate through leaky coaxial cables laid down between the base stations.

There is known an inter-base station synchronization system for communicating by using the leaky coaxial cables laid down between the base stations as disclosed in, for example, JP-A-2001-268628.

SUMMARY OF THE INVENTION

In the conventional inter-base station synchronization system, a receiver for detecting the error of a frame period is required to provide in the zone boundary between the leaky coaxial cables. In addition, in order to transmit the frame-period error information from this receiver to the base stations, it is necessary to use an exclusive line or dedicated radio waves.

The present invention is to provide an inter-base station synchronization system without using the above receiver and exclusive line or dedicated radio waves.

In order to achieve the above objective, according to one aspect of the invention, there is provided an inter-base station synchronization system having a plurality of base stations provided in certain intervals, leaky coaxial cables laid down between the base stations, and one mobile station or a plurality of mobile stations that measure a delay time difference of received signals from two adjacent ones of the base stations while the mobile stations are moving in the zone boundaries between the leaky coaxial cables, and that transmit the delay time difference information through the leaky coaxial cables to at least either one of the two adjacent ones of the base stations.

The base stations receive the delay time difference information from the mobile stations and adjust a frame timing so that they can be synchronized in the zone boundaries between the leaky coaxial cables.

In order to achieve the above objective, according to another aspect of the invention, there is provided an inter-base station synchronization system having a control station, a plurality of base stations provided in certain intervals, leaky coaxial cables laid down between the base stations, and one mobile station or a plurality of mobile stations that measure a delay time difference of received signals from two adjacent ones of the base stations while the mobile stations are moving in the zone boundaries between the leaky coaxial cables, and that transmit the delay time difference information through the leaky coaxial cables and the base stations to the control station.

The above control station causes its internal memory to store the delay time difference information received from the base stations for each zone boundary, and delivers timing information to each of the base stations by using the delay time difference information stored for each zone boundary so that the frame timings can be synchronized in each zone boundary between the leaky coaxial cables. The above function may be configured by the base station.

In addition, the above mobile stations track synchronously reference timings of the base stations. The speed with which the mobile stations track the reference timings is low enough that the timings do not change during the time when the mobile stations measure the delay time difference of received signals from the adjacent ones of the base stations. The delay time difference is measured by using the reference timings of the mobile stations that cause the reference timings to synchronously track.

Alternatively, the above mobile stations generate free-running timings that do not track the base stations, and measure the delay time difference by using the free-running timings.

According to an example of the invention, an inter-base station synchronization system can be achieved without providing any receiver for detecting a frame-period error in the zone boundary between the leaky coaxial cables, and without using any exclusive line or dedicated radio waves for the transmission of the frame-period error information to the base stations. In this inter-base station synchronization system, the mobile stations detect the frame-period error and transmit the frame-period error information through the leaky coaxial cables to the base stations.

Other objects, features and advantages of the invention will become apparent from the following description of the embodiments of the invention taken in conjunction with the accompanying drawings.

BRIEF DESCRIPTION OF THE DRAWINGS

FIGS. 7A and 7B are diagrams showing modes in which the mobile station is handed over from one base station to another base station in the embodiments 1 and 3, respectively.

FIG. 10 shows an example of the information stored in a memory provided within the base station or control station.

DESCRIPTION OF THE EMBODIMENTS

Embodiments of the invention will be described with reference to the accompanying drawings.

Embodiment 1

Figure 1:
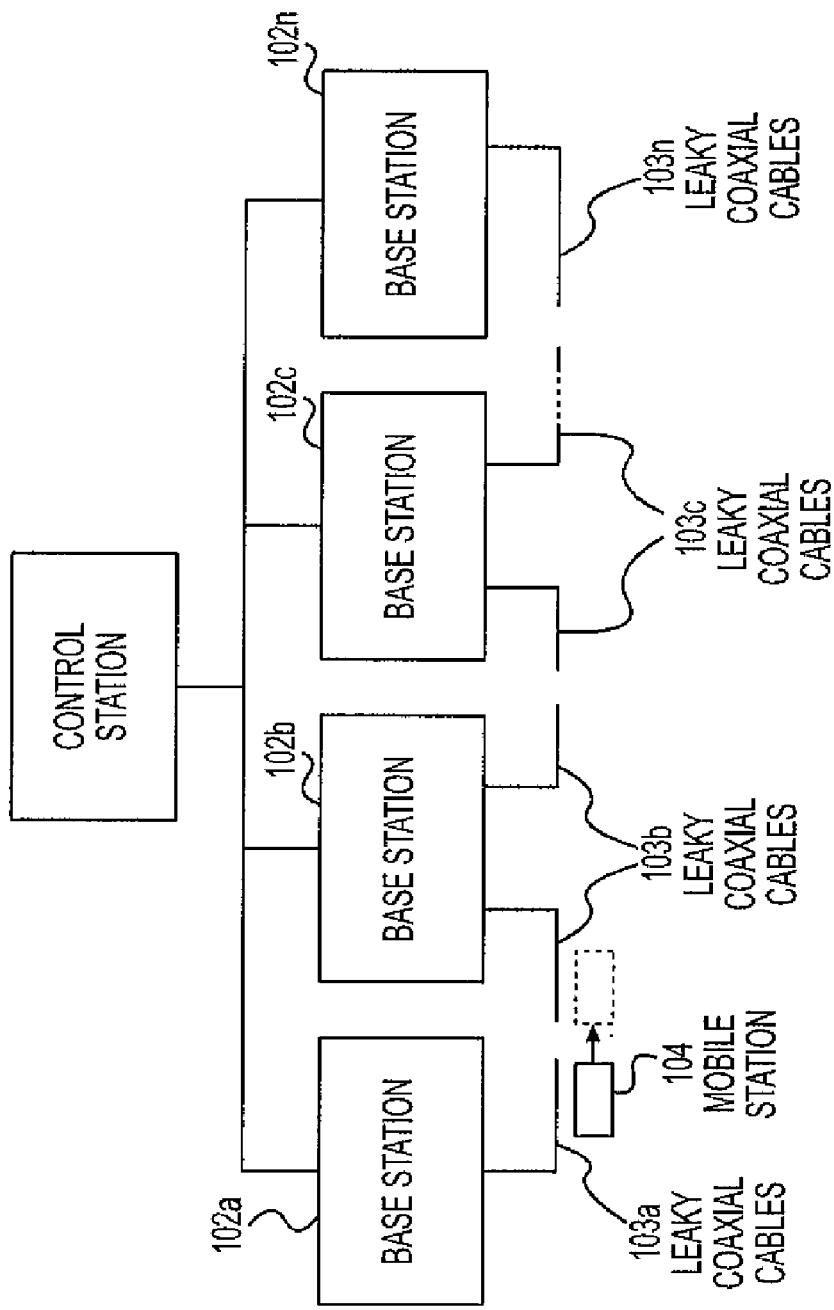
FIG. 1 is a block diagram of an inter-base station synchronization system of an embodiment 1 according to the invention.

FIG. 1 is a block diagram of an inter-base station synchronization system according to the embodiment 1 of the invention. In FIG. 1, the number of base stations and the number of leaky coaxial cables may be arbitrary.

Referring to FIG. 1, a control station 101 delivers sync information to the base stations.

A plurality of base stations 102a-102n are provided at certain intervals. Each of the base stations transmits frames synchronized according the sync information delivered from the control station 101.

Leaky coaxial cables 103a and 103b are laid down between the base stations 102a and 102b along a railway such as a bullet-rain railroad or along an express highway. Similarly, leaky coaxial cables 103b and 103c are laid down between the base stations 102b and 102c. In addition, leaky coaxial cables 103c-103n are laid down between the base stations 102c-102n.

A mobile station 104 is mounted on a railroad vehicle such as a bullet train or on a motor vehicle to communicate with the base stations 102a-102n through the leaky coaxial cables 103a-103n.

Figure 2:
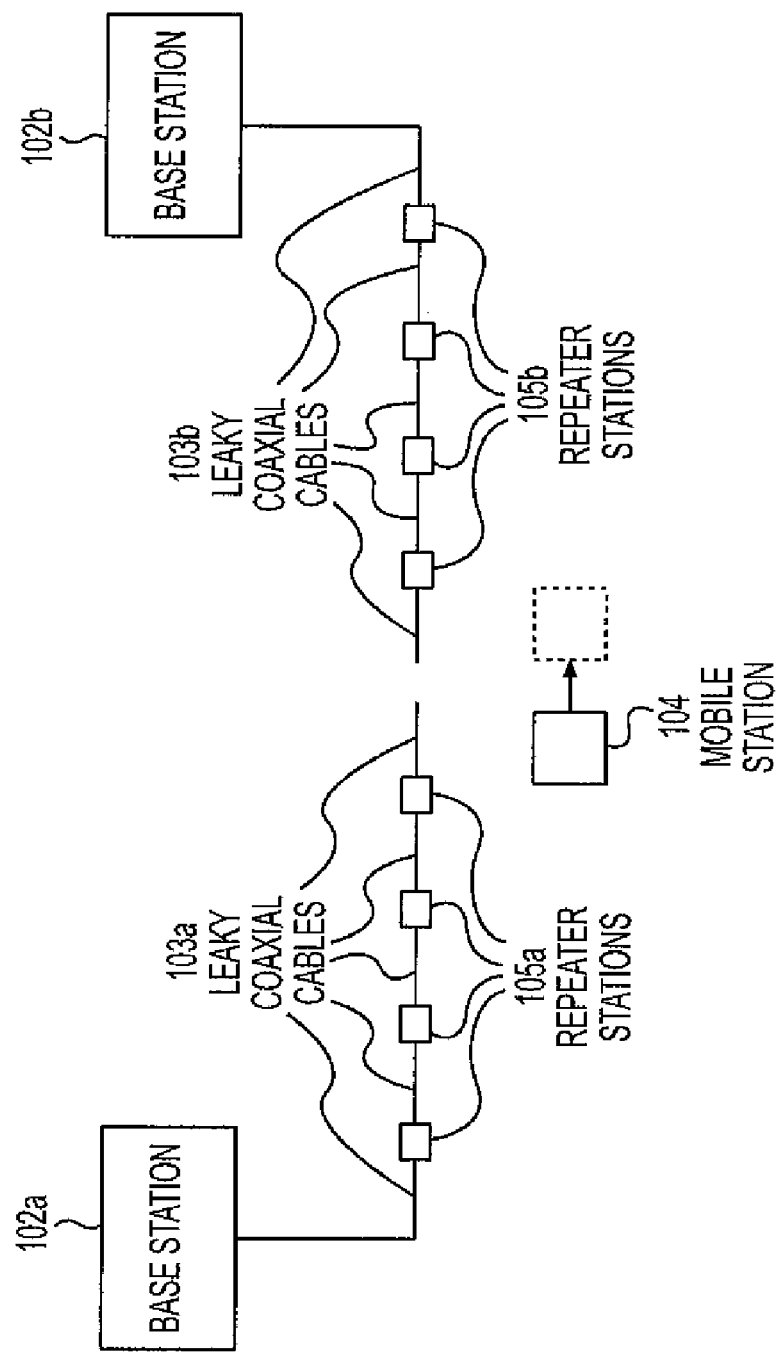
FIG. 2 is a-diagram showing the details of the inter-base station synchronization system of the embodiment 1 according to the invention.

FIG. 2 is a diagram showing the details of the inter-base station synchronization system according to the embodiment 1 of the invention, or the details of the cables between the base stations 102a and 102b shown in FIG. 1.

Referring to FIG. 2, repeaters 105a are provided at regular intervals on the leaky coaxial cable 103a to amplify the signal transmitted from the base station 102a and the signal transmitted from the mobile station 104. Repeater stations 105b are provided at regular intervals on the leaky coaxial cable 103b to amplify the signal from the base station 102b and the signal from the mobile station 104.

In this case, the number of repeaters may be arbitrary.

Figure 4:
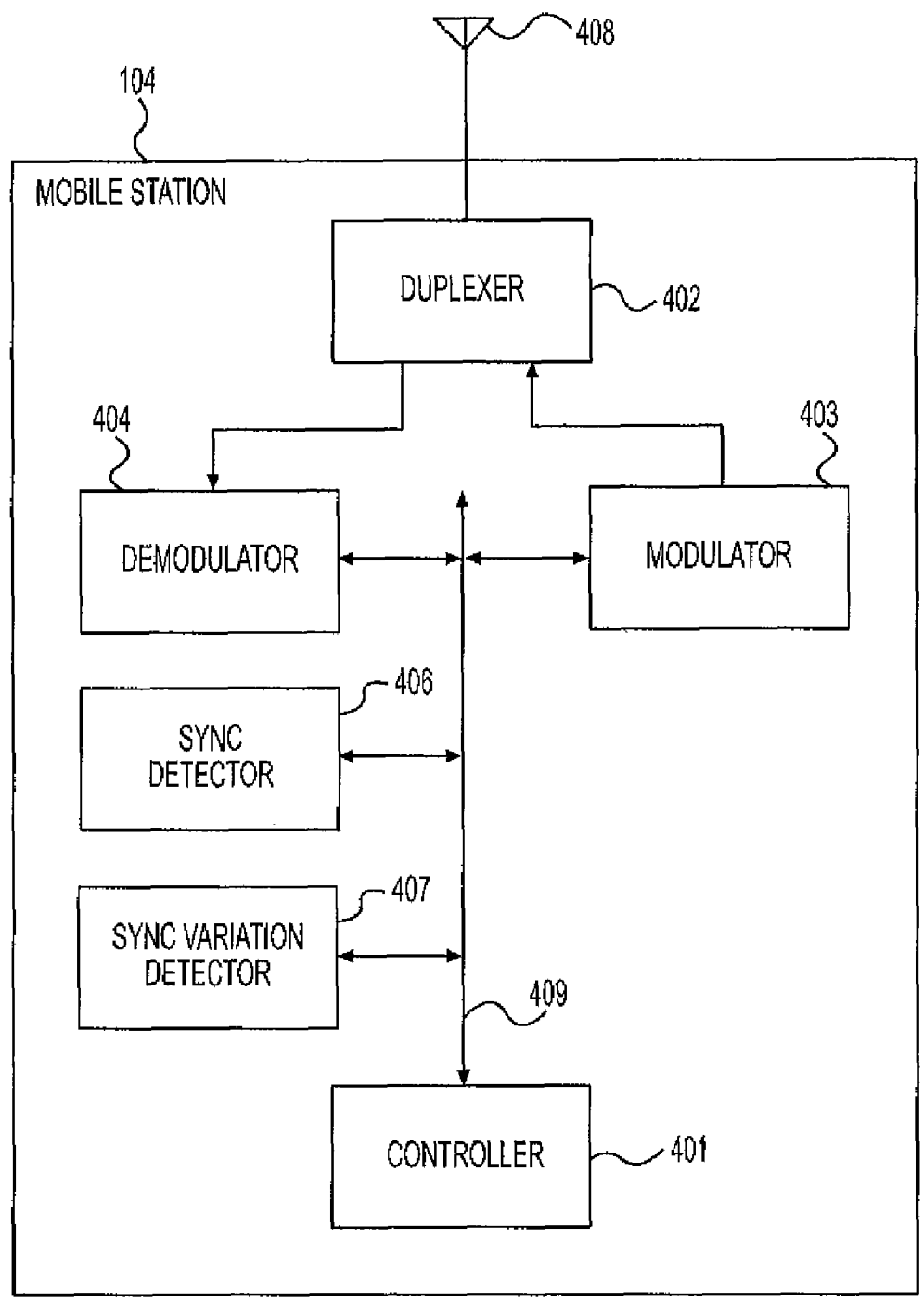
FIG. 4 is a diagram showing the details of the mobile station in the embodiment 1 of the invention.

FIG. 4 shows the details of the mobile station in the embodiment 1 of the invention, or the details of mobile station 104 shown in FIG. 2. A controller 401 controls the whole mobile station 104.

Referring to FIG. 4, an antenna 408 receives a signal transmitted from any one of the base stations 102a-102n through any one of the leaky coaxial cables 103a-103n. The received signal is supplied through a duplexer 402 to a demodulator 404. The antenna 408 also receives a signal supplied from a modulator 403 through the duplexer 404, and transmits it to any one of the base stations 102a-102n through any one of the leaky coaxial cables 103a-103n.

The demodulator 404 demodulates the received signal that is transmitted from any one of the base stations 102a-102n through any one of the leaky coaxial cables 103a-103n, antenna 408 and duplexer 402, and it supplies the demodulated information to the controller 401.

A sync detector 406 detects the sync bit (synchronization bit) of the frame produced from the demodulator 404. When the sync detector 406 detects the sync bit, it supplies the value indicative of the position of the sync bit, or a delay time to a sync variation detector 407. When the sync detector 406 cannot detect the sync bit, it does not supply delay time to the sync variation detector 407.

The sync variation detector 407 detects the amount of change of the delay time detected by the sync detector 406, or a delay time difference between the base stations, and supplies the delay time difference information to the controller 401.

The controller 401 receives the delay time difference information from the sync variation detector 407, and supplies it to the modulator 403 as transmission information.

The modulator 403 modulates the information including the delay time difference information that is generated by the controller 401, and supplies it through the duplexer 402 to the antenna 408. Thus, the modulated signal is transmitted from the antenna 408 to any one of the base stations 102a-102n through any one of the leaky coaxial cables 103a-103n.

A bus 409 is provided as a common signal line that interconnects the demodulator 404, sync detector 406, sync variation detector 407, controller 401 and modulator 403. In this embodiment, other signal lines than the bus may be used.

Figure 3:
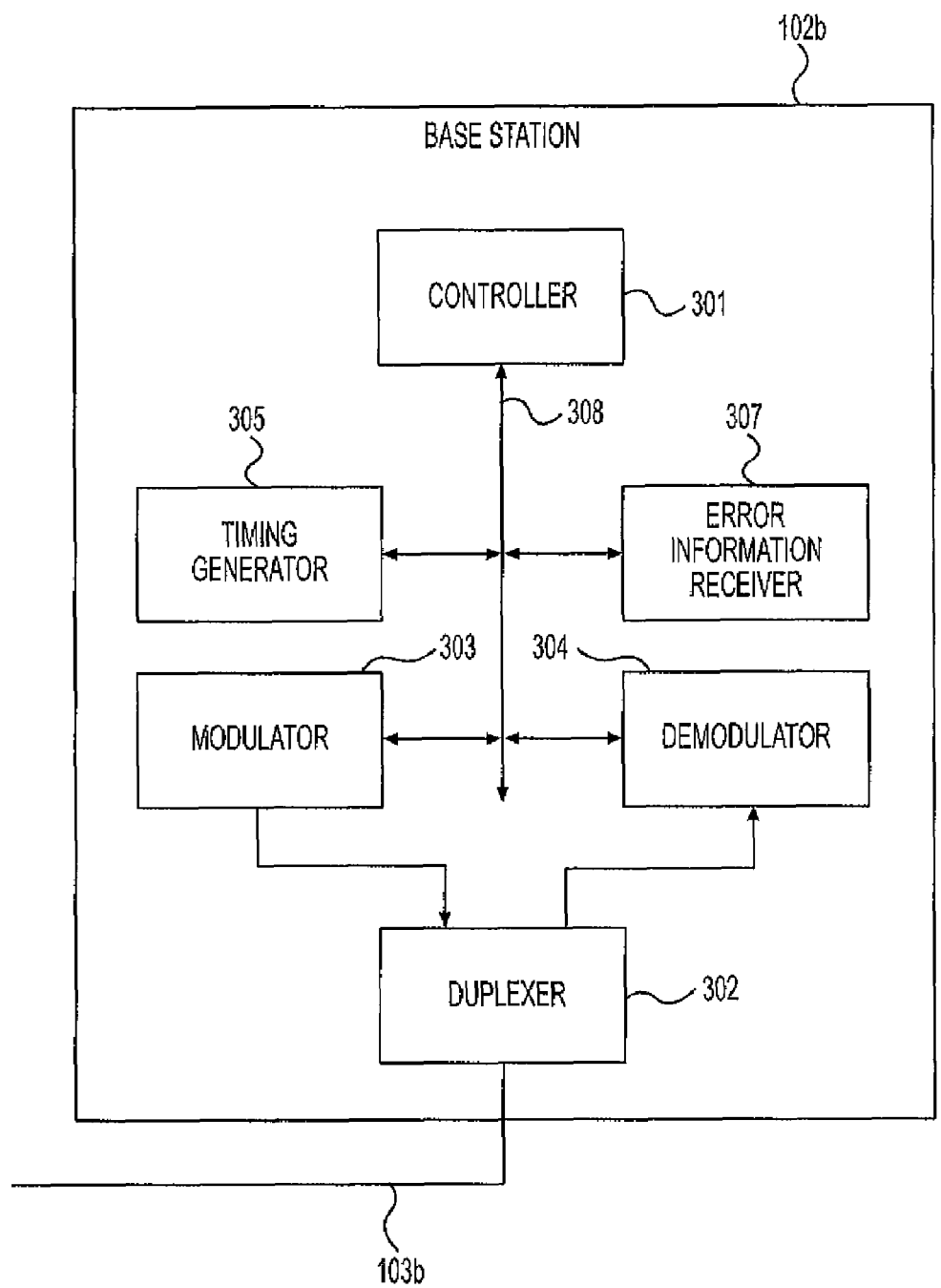
FIG. 3 is a diagram showing the details of the base station in the embodiment 1 of the invention.

FIG. 3 is a diagram showing the details of the base station in the embodiment 1 of the invention, or the details of the base station 102b shown in FIG. 2.

Referring to FIG. 3, a controller 301 controls the whole base station 102b, generates the information being transmitted, and receives the transmitted information.

A duplexer 302 receives a transmission signal fed from a modulator 303, and transmits it through the leaky coaxial cable 103b to the mobile station 104. In addition, the duplexer 302 also receives the transmission signal transmitted from the mobile station 104 through the leaky coaxial cable 103b, and supplies it to a demodulator 304.

The demodulator 304 receives the signal fed from the leaky coaxial cable 103b through the duplexer 302. The demodulator 304 demodulates the received signal, and supplies the demodulated information to the controller 301.

The controller 301 receives the demodulated information and supplies it to an error information receiver 307.

The error information receiver 307 processes the demodulated information received from the controller 301 to extract the delay time difference information sent from the mobile station 104, and supplies it to a timing generator 305.

The timing generator 305 receives the delay time difference information from the error information receiver 307, and generates frame timings resulting from timing adjustment according to the delay time difference information.

The modulator 303 modulates the information generated from the controller 301 with the timings generated from the timing generator 305. The modulated signal is transmitted through the duplexer 302 to the leaky coaxial cable 103b.

A bus 308 is provided as a common signal line that interconnects the demodulator 304, controller 301, error information receiver 307, timing generator 305 and modulator 303. In addition, other signal lines than the bus may be used in this embodiment.

The operation of the embodiment 1 according to the invention will be described below.

FIG. 6A-FIG. 10 are diagrams useful for explaining the correction of frame synchronization in the case when the mobile station 104 moves from the zone of leaky coaxial cable 103a to the zone of leaky coaxial cable 103b over the zone boundary.

Figure 6A:
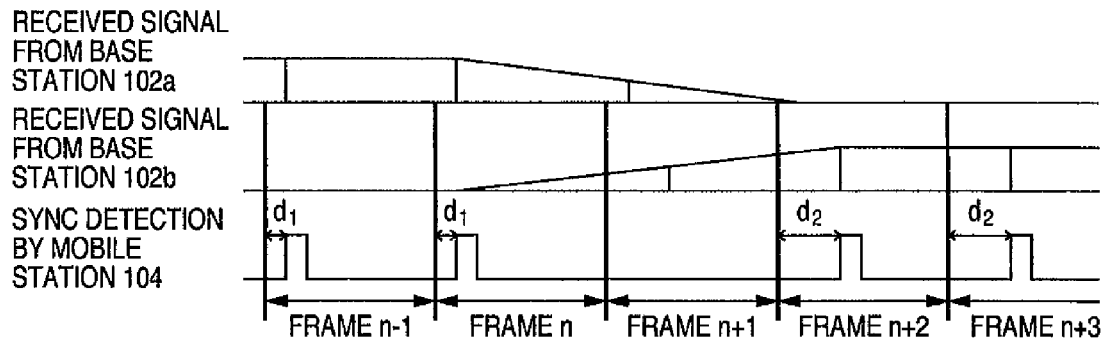
FIGS. 6A and 6B are diagrams useful for explaining the frame-synchronization correction, and respectively showing the sync (synchronization) timings before and after the frame-synchronization correction.
Figure 6B:
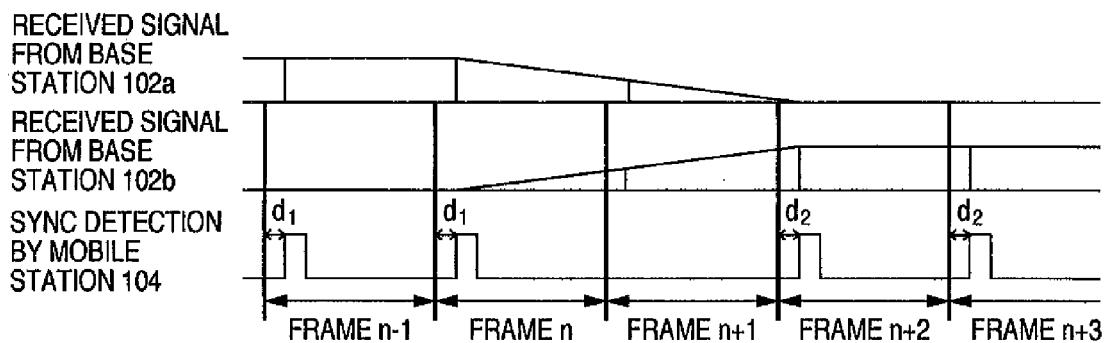

As illustrated in FIGS. 6A, 6B and 7A, the communication link is established between the base station 102a and the mobile station 104 (701). The first sync frame and second sync frame are generated based on the same sync information transmitted from the same control station 101 (703-706). The mobile station 104 receives the first sync frame from the base station 102a (704).

The mobile station 104, if detecting that the signal from the base station 102a has been reduced to a value less than a predetermined value, selects a base station to which it is to be handed over (702). The mobile station 104, when selecting the base station 102b, receives the second sync frame from the base station 102b (706).

The mobile station 104 receives the signal from the base station 102a until the frame n (704), but it receives the signal from the base station 102b for the frame n+2 and the following (706).

Since the line length difference between the leaky coaxial cables 103a and 103b gives rise to the delay time difference, the sync detector 406 detects $d_1$ until frame n, but $d_2$ from frame n+2.

In the frame n+1 shown in FIGS. 6A and 6B, the signal from the base station 102a interferes with that from the base station 102b, and thus the sync detector 406 cannot detect the sync bit and hence does not detect delay time.

The sync variation detector 407 detects that the delay time is changed from $d_1$ to $d_2$ in the frame n+2, and supplies the information of delay time difference $d_2-d_1$ to the controller 401.

The controller 401 causes the transmission information of frame n+3 and the following frames to contain the above delay time difference, and supplies the transmission information including the delay time difference to the modulator 403. The above delay time difference information for frame n+3 and the following frames is transmitted through the leaky coaxial cable 103b to the base station 102b (707).

Here, an example of the computation of delay time difference information will be described in more detail with reference to FIG. 8A. In FIG. 8A, the starting point and endpoint correspond to (a) and (b) shown in FIG. 7A.

First, the sync detector 406 detects the first sync bit contained in the frame transmitted from the base station 102a, and the second sync bit contained in the frame transmitted from the base station 102b (S801). The detected sync bits are respectively delayed certain delay times ($d_n$, n is a natural number) as shown in FIGS. 6A and 6B.

In the embodiment 1, these delay times are determined by the lengths of the leaky coaxial cables. In other words, the delay time for each base station can be predicted. In such case, in order to increase the computation accuracy, it is possible to consider, for example, a configuration in which a table prepared in a memory (not shown) stores the information of delay time from each base station as shown in FIG. 10. In FIG. 10, reference numeral 1001 represents the base station number, 1002 represents the code for identifying the base stations, 1003 represents the information of known delay time, and 1004 represents the information of delay time computed in consideration of the moving velocity of the mobile station.

Referring back to FIG. 8A, the delay time of the first sync bit (called the first delay time) is computed by using the first sync bit detected in step S801 and the information on the table shown in FIG. 10 (S802). The computed first delay time is stored in a certain memory.

Similarly, the second delay time of the second sync bit is computed, and stored in a certain memory.

Then, in step S803, the delay time difference information between the first sync frame transmitted from the base station 102a and the second sync frame transmitted from the base station 102b is generated by using the first delay time and second delay time stored in the memory.

Figure 9A:
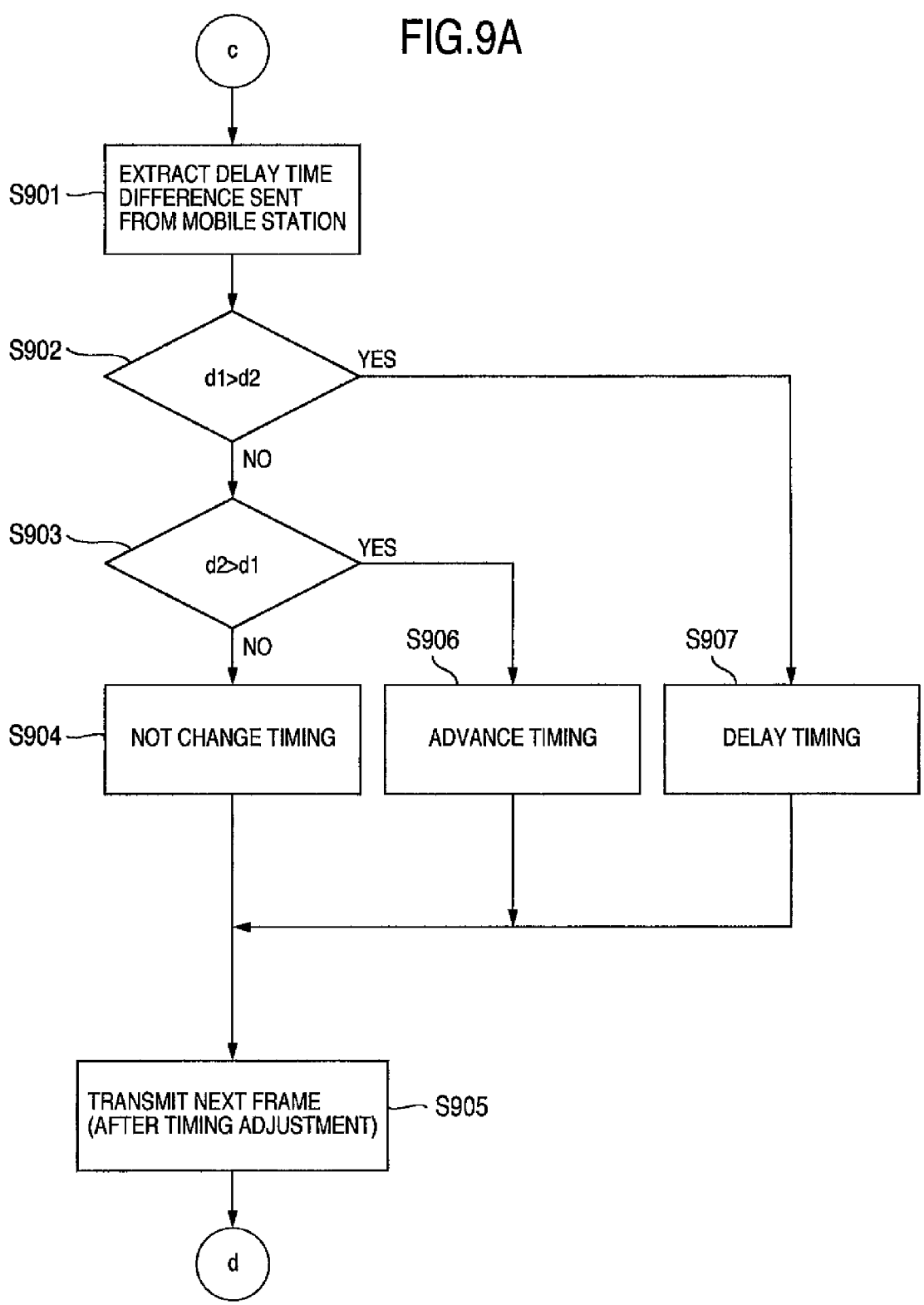
FIGS. 9A and 9B are respectively flowcharts of the process between (c) and (d) of FIGS. 7A and 7B in which the base station adjusts the timings of frames in the embodiments 1 and 4.

The generated delay time difference information is transmitted to the base station 102b An example of the timing adjustment of the sync frame transmitted from the base station 102b will be described in more detail with reference to FIG. 9A. The starting point and endpoint shown in FIG. 9A correspond to (c) and (d) shown in FIG. 7A.

The base station 102b receives the signal containing the above delay time difference information from the leaky coaxial cable 103b through the duplexer 302 (707). The demodulator 304 demodulates the signal containing the delay time difference information. The error information receiver 307 extracts the delay time difference information $d_1-d_2$ from the demodulated information, and supplies it to the timing generator 305 (S901).

The timing generator 305, when receiving the delay time difference information, adjusts the generated timing to advance by $d_2-d_1$ (S902-907). In other words, if $d_2$ is larger than $d_1$, the timing is adjusted to advance (S903, S906). If $d_2$ is smaller than $d_1$, the timing is adjusted to delay (S902, S907). If $d_2$ equals to $d_1$, the timing is not changed (S904).

Thus, the modulated signal from the modulator 303 is transmitted with the timing adjusted by the timing generator 305 (708, S905).

Since $d_2$ is larger than $d_1$ in FIG. 6A, the signal transmitted from the base station is advanced by this difference when the mobile station 104 moves away from the leaky coaxial cable 103a to be closer to the cable 103b. When the mobile station 104 then moves over this zone boundary, the signal from the leaky coaxial cable 103a and the signal from the leaky coaxial cable 103b have no delay time difference, or $d_2 = d_1$.

Thereafter, when confirming that the delay time difference is zero, the mobile station 104 makes handover operation so that it can be handed over from the base station 102a to the base station 102b. Then, the mobile station 104 establishes the communication link with the base station 102b (709).

In addition, it is possible that, when the delay time difference is confined within a certain range, the mobile station 104 makes the handover. If the delay time difference is not within the certain range, the above procedure may be again performed.

Embodiment 2

The embodiment 1 can be applied to the case in which the reference timing of the mobile station is caused not to track the base stations or is caused to track the base stations with a low speed. The embodiment 2 of the invention can be applied to the case in which the reference timing of the mobile station is caused to track the base stations with high speed.

Figure 5:
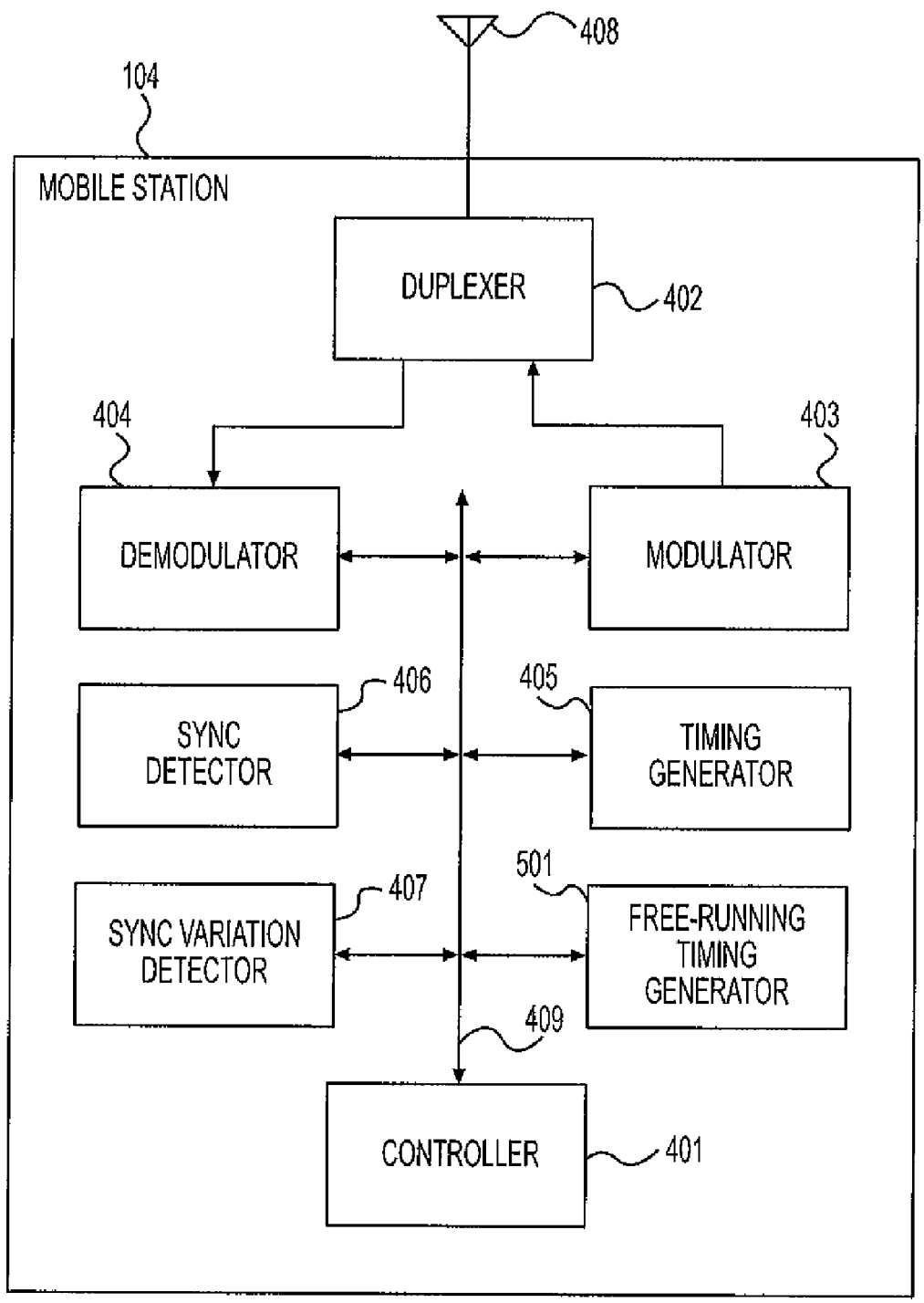
FIG. 5 is a diagram showing the details of the mobile station 104 in an embodiment 2 of the invention.

FIG. 5 shows the details of the mobile station 104 in the embodiment 2 of the invention.

The configuration of the mobile station 104 in the embodiment 2 is different from that shown in FIG. 4 in that a timing generator 405 and a free-running timing generator 501 are additionally provided.

In FIG. 5, the antenna 408, duplexer 402, demodulator 404, modulator 403 and bus 409 are the same as those in FIG. 4, and thus will not be described.

The timing generator 405 adjusts the timing of the mobile station 104 according to the information of delay time detected by the sync detector 406 and generates the timing synchronized with the received signal, or the base station.

Therefore, in the embodiment 2, when the mobile station 104 moves away from the leaky coaxial cable 103a to be closer to the cable 103b, the timing of the mobile station 104 tries to track the received signal from the base station 102b. As a result, the delay time difference between the base stations 102a and 102b could not be accurately detected.

Thus, the free-running timing generator 501 is added to the configuration of the mobile station 104. The free-running generator 501 generates the free-running timing of the mobile station 104 irrespective of the received signal. The sync variation detector 407 detects the amount of change of the delay time with respect to the free-running timing.

The detected amount of change may be stored in the memory as shown in FIG. 10.

Figure 8A:
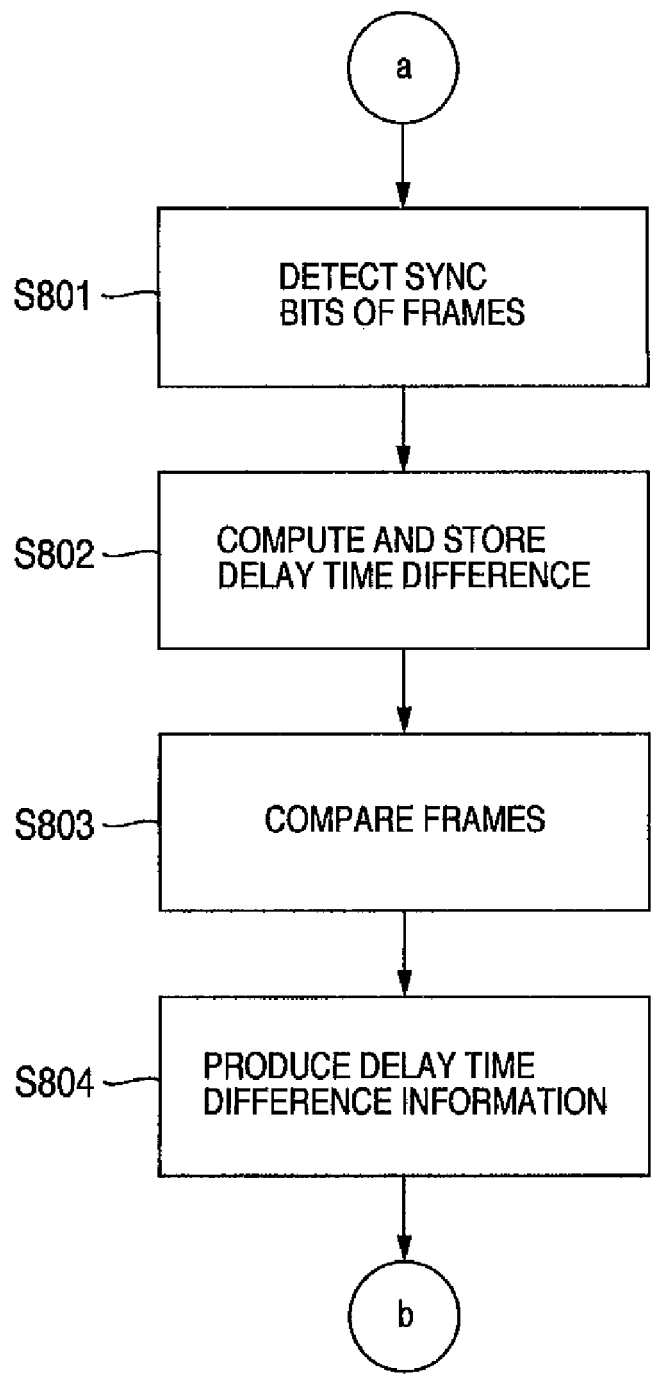
FIGS. 8A and 8B are respectively flowcharts of the process between (a) and (b) of FIGS. 7A and 7B in which the mobile station generates delay time difference information by using the frames transmitted from the base stations in the embodiments 1 and 2.
Figure 8B:
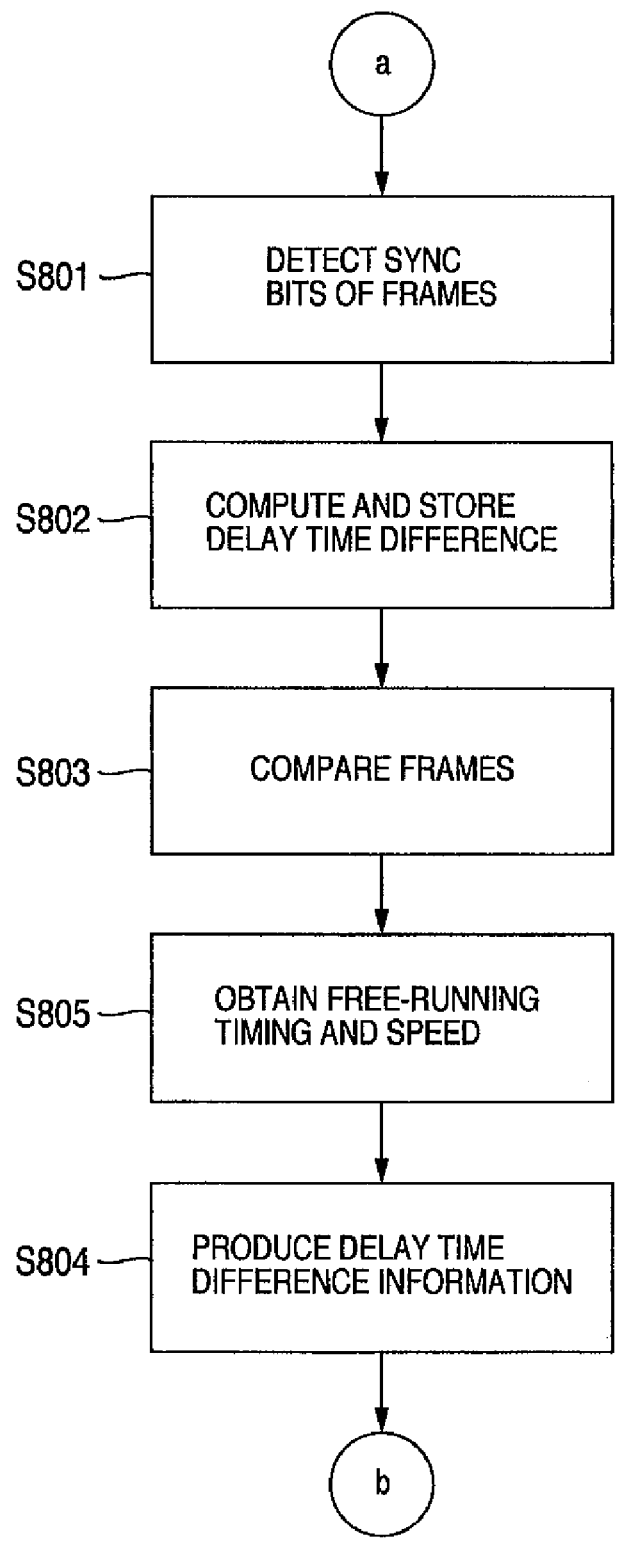

FIG. 8B shows an example of the above process. The flowchart shown in FIG. 8B is a modification of the flowchart of FIG. 8A in which a step 805 is added between the steps S803 and S804. This step 805 is used to detect the amount of change of the delay time relative to the free-running timing and speed.

Thus, the mobile station 104 detects the delay time difference information between the base stations 102a and 102b, and transmits it to the base station 102b. Therefore, the transmission timing of the base station 102b can be adjusted as in the embodiment 1.

Embodiment 3

In the embodiments 1 and 2, the mobile station 104 supplied its own detected delay time difference to any one of the base stations 102a-102n, and the base station that received the delay time difference information adjusted the transmission timing according to this information.

In the embodiment 3 of the invention, the delay time difference information detected by the mobile station 104 is transmitted through any one of the base stations 102a-102n to the control station 101.

The control station 101 stores as $\Delta d_{ab}, \Delta d_{bc}, \ldots, \Delta d_{mn}$ the delay time difference information that is obtained at each zone boundary, or between the leaky coaxial cables 103a-103b (when the mobile station 104 moves away from the cable 103a to be closer to the cable 103b), between the cables 103b-103c (when the mobile station 104 moves away from the cable 103b to be closer to the cable 103c), . . . , and between the cables 103m-103n (when the mobile station 104 moves away from the cable 103m to be closer to the cable 103n).

The delay time difference information obtained when the mobile station 104 moves in the opposite direction (for example, from cable 103b to cable 103a) is stored with its sign inverted. If the control station 101 receives the delay time difference information obtained when the mobile station 104 moves from the cable 103b to cable 103a, it stores $\Delta d_{ab} = -$(delay time difference information).

The above $\Delta d_{ab}, \Delta d_{bc}, \ldots, \Delta d_{mn}$ are updated when the control station 101 again receives the delay time difference information of the corresponding zone boundary. The control station 101 generates sync information by using the above $\Delta d_{ab}, \Delta d_{bc}, \ldots, \Delta d_{mn}$ and delivers it to each base station. For example, the control station 101 delays the sync information by $\Delta d_{ab}$ to the base station 102b, by $\Delta d_{ab} + \Delta d_{bc}$ to the base station 102c, and by $\Delta d_{ab} + \Delta d_{bc} + \ldots + \Delta d_{mn}$ to the base station 102n. The sync information to be delivered from the control station 101 to each base station is updated at intervals of a predetermined period.

In the embodiment 3, since the control station 101 controls the timing of each base station, each base station does not adjust the timing.

Figure 7B:
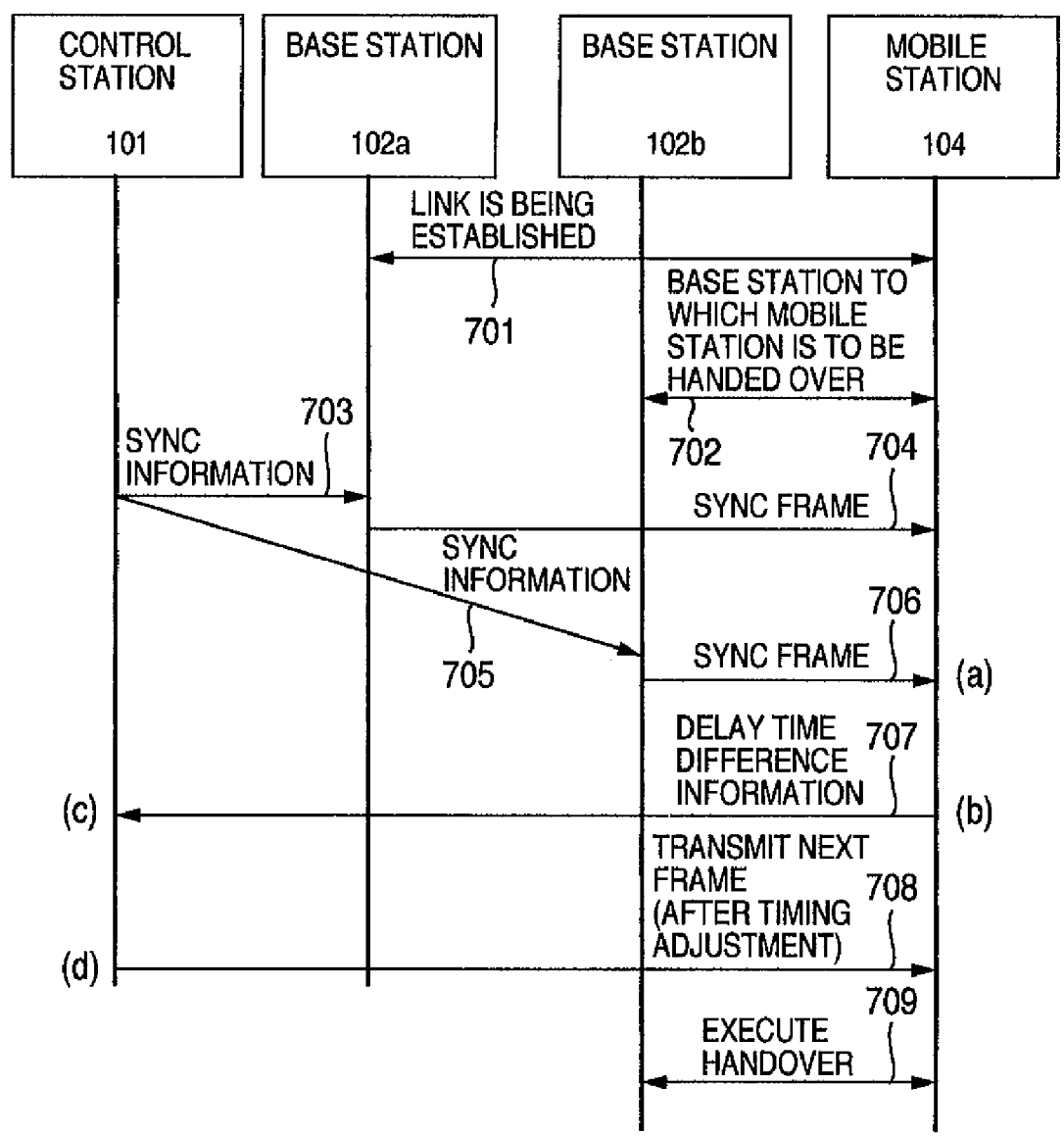

FIG. 7B shows an example of the above process. As illustrated in FIG. 7B, part of the process performed by the base station 102b is executed by the control station 101.

Embodiment 4

In the embodiment 3, the received delay time difference information $\Delta d_{ab}, \Delta d_{bc}, \ldots, \Delta d_{mn}$ of each zone boundary was updated each time the control station 101 received it when the mobile station 104 passed the corresponding zone boundary. Here, $\Delta d_{ab}$ is the difference between $d_2$ and $d_1$ stored in the memory shown in FIG. 10. If necessary, free-running information may be considered.

In the embodiment 4, when receiving the delay time difference information of the corresponding zone boundary, the control station 101 averages it and the past received delay time difference information of the corresponding zone boundary to produce average delay time difference information $\Delta d_{ab}, \Delta d_{bc}, \ldots, \Delta d_{mn}$. The averaging process may be any of other various methods than the above.

The averaging process on the delay time difference information may use the delay times and information of free-running timing already set and stored in the memory shown in FIG. 10.

Figure 9B:
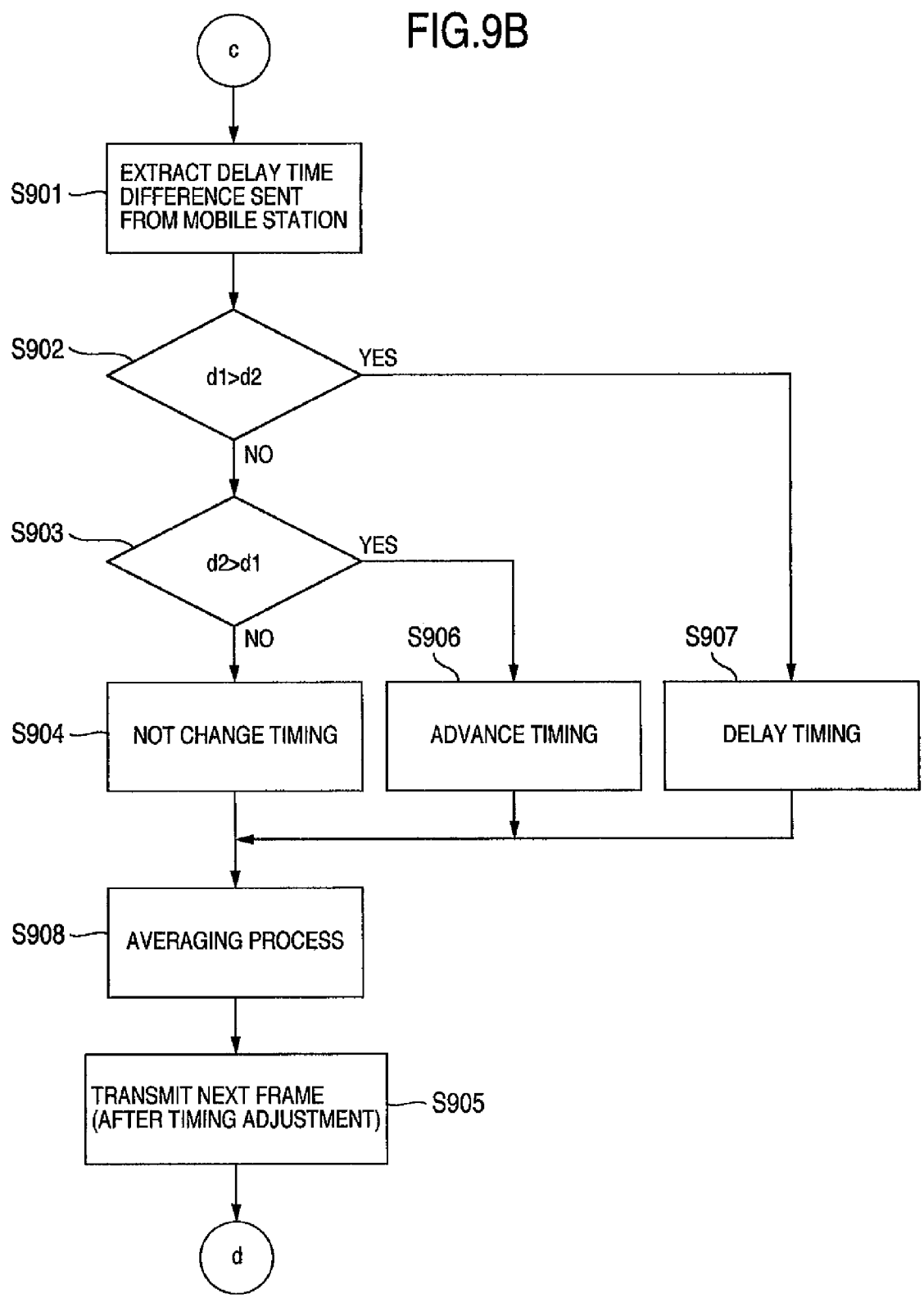

FIG. 9B shows an example of the above process. The flowchart shown in FIG. 9B is a modification of the previous flowchart in which an averaging process step S908 is added to the flowchart shown in FIG. 9A.

Each of the embodiments 1 through 4 above described in detail can be effectively applied to, for example, an LCX train radio system using leaky cables laid down along railways. In this system, a radio communication can be established between each of a plurality of base stations provided at arbitrary locations in the leaky cables and a terminal station installed within a moving train.

Therefore, according to the embodiments of the invention, an inter-base station synchronization system can be constructed to be suited to, for example, a train radio system having base stations provided along railways and a terminal installed within a train moving along the rail ways. This inter-base station synchronization system can be applied to other various mobile systems.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system for synchronization between base stations, comprising:
    a plurality of base stations provided at predetermined intervals;
    leaky coaxial cables laid down between the base stations; and
    a mobile station that measures a delay time difference information between received signals from two adjacent ones of the base stations while the mobile station moves along zone boundary between the leaky coaxial cables, and that transmits the delay time difference information through one of the leaky coaxial cables to at least either one of the two adjacent base stations.

2. The system according to claim 1, wherein one of the base stations receives the delay time difference information from the mobile station and adjusts frame timings to synchronize two frame timings at the zone boundary between the leaky coaxial cables.

3. The system according to claim 1, further comprising a control station, wherein the delay time information is transmitted to the control station through one of the leaky coaxial cables and one of the mobile stations.

4. The inter-base station synchronization system according to claim 3, wherein the control station causes its internal memory to store the delay time difference information received for each zone boundary from the mobile station, and delivers timing information to each of the base stations so that frame timings can be synchronized at each zone boundary of the leaky coaxial cables by using the delay time difference information stored for each zone.

5. The system according to claim 1, wherein the mobile station causes reference timings to synchronously track the base stations, the speed with which the mobile station causes the reference timings to track is low enough that timings do not change during the time when the mobile station measures the delay time difference information of the received signals from the adjacent ones of the base stations, and the delay time difference is measured by using the reference timings that the mobile station causes to synchronously track.

6. The system according to claim 1, wherein the mobile station generates free-running timings that do not synchronously track the base stations, and measures the delay time difference information by using the free-running timings.

7. A method for synchronization between a plurality of base stations provided at certain intervals by using leaky coaxial cables laid down between the base stations, the method comprising the steps of:

measuring a delay time difference information of received signals from two adjacent ones of the base stations by a mobile station while the mobile station moves in the zone boundary between the leaky coaxial cables; and transmitting the delay time difference information from the mobile station to at least either one of the two adjacent base stations through the leaky coaxial cables.

8. A base station for communicating with a mobile station via a leaky coaxial cable, comprising:

a duplexer connected to the leaky coaxial cable;

a receiver for receiving a signal from the mobile station via the duplexer;

an obtaining unit for obtaining delay time difference information from the received signal, the delay time difference information be calculated by the mobile station;

a signal generator for generating a transmitting signal, the signal generator adjusts a frame timing of the transmitting signal to synchronize with another frame timing transmitted by an another base station based on the obtained delay time difference information in a zone boundary of the leaky coaxial cable at which the mobile station locate; and a transmitter for transmitting the transmitting signal to the mobile station via the duplexer.

9. The base station according to claim 8, wherein the base station further comprises:

a database which stores other delay time difference information of the other base stations; and wherein the frame timing is further adjusted based on the other delay time difference information.

10. The base station according to claim 8, wherein the base station connects to a control station which controls the base station and other base stations; and wherein the frame timing is further adjusted based on synchronization information transmitted from the control station.

* * * * *